US012720278B2

(12) United States Patent
Kim et al.

(10) Patent No.: US 12,720,278 B2
(45) Date of Patent: Aug. 25, 2026

(54) METHOD FOR TRACKING PHYSICAL LOCALIZATION OF CELLULAR DEVICES IN MOBILE COMMUNICATION NETWORKS AND THE SYSTEM THEREOF

(71) Applicant: Korea Advanced Institute of Science and Technology, Daejeon (KR)

(72) Inventors: Yongdae Kim, Daejeon (KR); Taekkyung Oh, Daejeon (KR)

(73) Assignee: KOREA ADVANCED INSTITUTE OF SCIENCE AND TECHNOLOGY, Daejeon (KR)

(*) Notice: Subject to any disclaimer, the term of this patent is extended or adjusted under 35 U.S.C. 154(b) by 293 days.

(21) Appl. No.: 18/437,994

(22) Filed: Feb. 9, 2024

(65) Prior Publication Data

US 2025/0203321 A1 Jun. 19, 2025

(30) Foreign Application Priority Data

Dec. 13, 2023 (KR) ........................ 10-2023-0180942

(51) Int. Cl.

| | |
|---|---|
| ***H04W 4/029*** | (2018.01) |
| ***H04W 4/14*** | (2009.01) |
| ***H04W 72/21*** | (2023.01) |

(52) U.S. Cl.

CPC ............. *H04W 4/029* (2018.02); *H04W 4/14* (2013.01); *H04W 72/21* (2023.01)

(58) Field of Classification Search

CPC ... H04W 12/02; H04W 12/122; H04W 12/06; H04W 12/12; H04W 12/08; H04W 12/63; H04W 4/80; H04W 12/121; H04W 12/03; H04W 12/50; H04W 4/029; H04W 4/02; H04W 4/023; H04W 12/128; H04W 12/71; H04W 4/30; H04W 24/08; H04W 48/04; H04W 12/086; H04W 12/106; H04W 12/10; H04W 4/90; H04W 8/005; H04W 12/30; H04W 12/033; H04W 48/16; H04W 88/02; H04W 12/126; H04W 12/108; H04W 64/00; H04W 48/18; H04W 12/088; H04W 8/24; H04W 12/00; H04W 24/10;

(Continued)

(56) References Cited

U.S. PATENT DOCUMENTS

| | | | | |
|---|---|---|---|---|
| 7,856,209 B1 * | 12/2010 | Rawat | .................. | H04W 12/12 455/67.11 |
| 2020/0236554 A1 * | 7/2020 | Lee | ...................... | H04W 12/03 |

(Continued)

*Primary Examiner* — Kwasi Karikari

(74) *Attorney, Agent, or Firm* — ArentFox Schiff LLP; Joseph M. Maraia

(57) ABSTRACT

Provided is a method and system for tracking a physical location of a user equipment (UE) in a mobile communication network that may specify a physical location by monitoring an uplink signal of a target UE, the method including generating a specific traffic pattern by generating voice and short message service (SMS) traffic and tracking a radio network traffic identifier (RNTI) of a target UE using fingerprinting based on the specific traffic pattern; fixing the RNTI of the target UE and continuously receiving scheduling information on an uplink signal transmitted from the target UE by decoding a downlink control information (DCI) message transmitted from a base station; and tracking a physical location by monitoring the uplink signal of the target UE based on the scheduling information.

9 Claims, 8 Drawing Sheets

(58) Field of Classification Search
CPC ........... H04W 12/0431; H04W 12/102; H04W 4/025; H04W 12/0471; H04W 12/69; H04W 72/23; H04W 12/75; H04W 76/27; H04W 12/068; H04W 48/02; H04W 12/062; H04W 8/20
See application file for complete search history.

(56) References Cited

U.S. PATENT DOCUMENTS

2021/0092626 A1* 3/2021 Xu ...................... H04W 12/037
2024/0298183 A1* 9/2024 Garcia Morchon .. H04W 12/69
2025/0113193 A1* 4/2025 Zhou ................... H04W 12/122

* cited by examiner

400 Attacker 300 eNB

Figure 2:
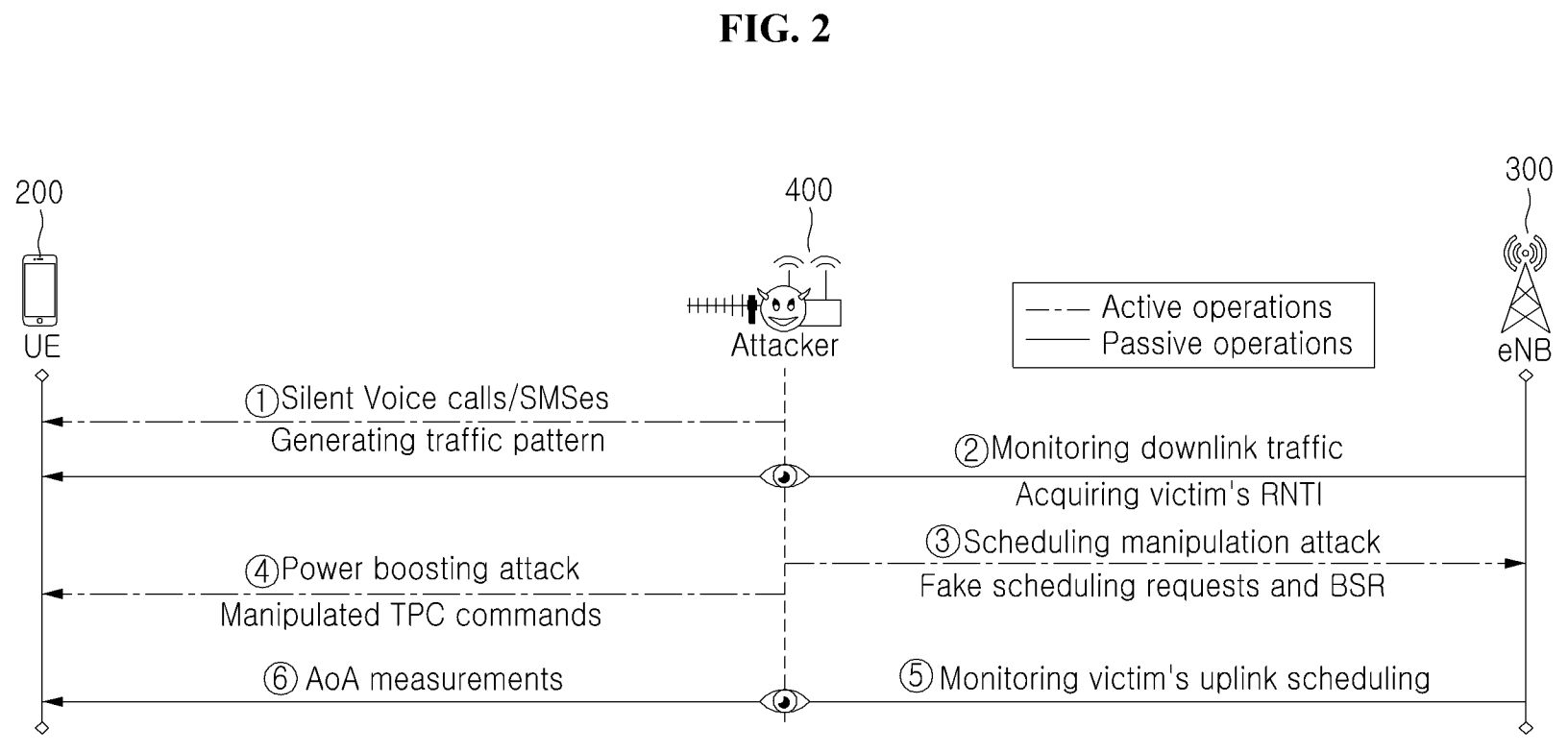

Active operations

Passive operations

① Silent Voice calls/SMSes

Generating traffic pattern

② Monitoring downlink traffic

Acquiring victim's RNTI

③ Scheduling manipulation attack

Fake scheduling requests and BSR

④ Power boosting attack

Manipulated TPC commands

⑤ Monitoring victim's uplink scheduling

⑥ AoA measurements

METHOD FOR TRACKING PHYSICAL LOCALIZATION OF CELLULAR DEVICES IN MOBILE COMMUNICATION NETWORKS AND THE SYSTEM THEREOF

CROSS-REFERENCE TO RELATED APPLICATION(S)

This application claims the priority benefit of Korean Patent Application No. 10-2023-0180942, filed on Dec. 13, 2023, in the Korean Intellectual Property Office, the disclosure of which is incorporated herein by reference.

BACKGROUND

1. Field of the Invention

Example embodiments relate to a method and system for tracking a physical location of a user equipment (UE) in a mobile communication network, and more particularly, to technology for specifying a physical location by monitoring an uplink signal of a target UE.

2. Description of the Related Art

The existing system for tracking a physical location of a mobile communication terminal does not sufficiently consider a real environment. In the real environment, radio ID information called a radio network temporary identifier (RNTI) is required to track a physical location of a user equipment (UE) in a mobile communication network. However, since the RNTI is temporary ID information that periodically varies, consistent tracking of this ID is inevitable to continuously monitor a signal of a UE and to track a location of the UE. Also, if a target UE does not use a mobile communication service and does not generate any signal accordingly, there is a difficulty that location tracking of the UE using a signal of the UE may not be performed.

When location tracking of the UE is performed in the mobile communication network, many difficulties arise in constructing setup of the same equipment as a base station. Therefore, when tracking a location, there is a difficulty that an uplink signal of the target UE is not properly detected/monitored. For example, when the UE is located close to the base station, it may be impossible for a tracker to detect a signal of the corresponding UE since the UE transmits an uplink signal with low power.

Mobile communication companies improve quality of service (QOS) by additionally building equipment, called a cellular repeater, to overcome a poor radio channel state. Here, a plurality of cellular repeaters are used in a place in which a base station signal does not reach or inside a building. In general, the cellular repeater serves to amplify all of a downlink signal transmitted from the base station and an uplink signal transmitted from the UE using a bi-directional wireless antenna. The cellular repeater may be very helpful to a user by contributing to improving quality of mobile communication service, but may be disadvantageous to a tracker that performs location tracking. For example, if the UE is located in an area in which the cellular repeater is installed or inside a building, the UE transmits an uplink signal with low power due to influence of the cellular repeater and the corresponding signal is amplified by the cellular repeater and is transmitted to the base station through a wireless antenna installed in the cellular repeater. Here, since the uplink signal of the UE is detected by the wireless antenna of the cellular repeater, an attacker is more likely to recognize the cellular repeater as a location tracking target rather than the targeted UE.

SUMMARY

An objective of example embodiments is to track a radio network temporary identifier (RNTI) of a target user equipment (UE) with a specific traffic pattern through voice and short message service (SMS) traffic, to decode a downlink control information (DCI) message transmitted from a base station, to receive scheduling information on an uplink signal transmitted from the target UE, and to track a physical location by monitoring the uplink signal of the target UE.

However, technical subjects to be solved by the present invention are not limited to the aforementioned subjects and may be variously expanded without departing from the technical spirit and scope of the present invention.

According to an aspect, there is provided a method of tracking a physical location of a UE in a mobile communication network, the method including generating a specific traffic pattern by generating voice and short message service (SMS) traffic and tracking a radio network traffic identifier (RNTI) of a target UE using fingerprinting based on the specific traffic pattern; fixing the RNTI of the target UE and continuously receiving scheduling information on an uplink signal transmitted from the target UE by decoding a downlink control information (DCI) message transmitted from a base station; and tracking a physical location by monitoring the uplink signal of the target UE based on the scheduling information.

Also, the physical location tracking method may further include controlling the uplink signal transmitted from the target UE by manipulating the DCI message in a radio channel based on the RNTI of the target UE and a configuration of the base station after tracking the RNTI of the target UE.

According to an aspect, there is provided a system for tracking a physical location of a UE in a mobile communication network, the system including a tracking unit configured to generate a specific traffic pattern by generating voice and SMS traffic and to track an RNTI of a target UE using fingerprinting based on the specific traffic pattern; a signal receiver configured to fix the RNTI of the target UE and to continuously receive scheduling information on an uplink signal transmitted from the target UE by decoding a downlink control information (DCI) message transmitted from a base station; and a location tracking unit configured to track a physical location by monitoring the uplink signal of the target UE based on the scheduling information, and may further include a signal controller configured to control the uplink signal transmitted from the target UE by manipulating the DCI message in a radio channel based on the RNTI of the target UE and a configuration of the base station.

According to some example embodiments, it is possible to overcome limitations of radio signal-location tracking occurring in a real environment when tracking a location of a mobile communication terminal by tracking an RNTI of a target UE with a specific traffic pattern through voice and SMS traffic, by decoding a DCI message transmitted from a base station, by receiving scheduling information on an uplink signal transmitted from the target UE, and by tracking a physical location through monitoring of the uplink signal of the target UE.

According to some example embodiments, it is possible to improve probability and performance of location tracking through sufficient application to various mobile communication location tracking systems to be invented in the future as well as the existing invented location tracking systems.

However, effects of the present invention are not limited to the aforementioned effects may be variously expanded without departing from the technical spirit and scope of the present invention.

BRIEF DESCRIPTION OF THE DRAWINGS

These and/or other aspects, features, and advantages of the invention will become apparent and more readily appreciated from the following description of embodiments, taken in conjunction with the accompanying drawings of which:

FIG. 2 illustrates an unauthorized multi-angulation attack (UMA) according to an example embodiment;

DETAILED DESCRIPTION

Figure 1:
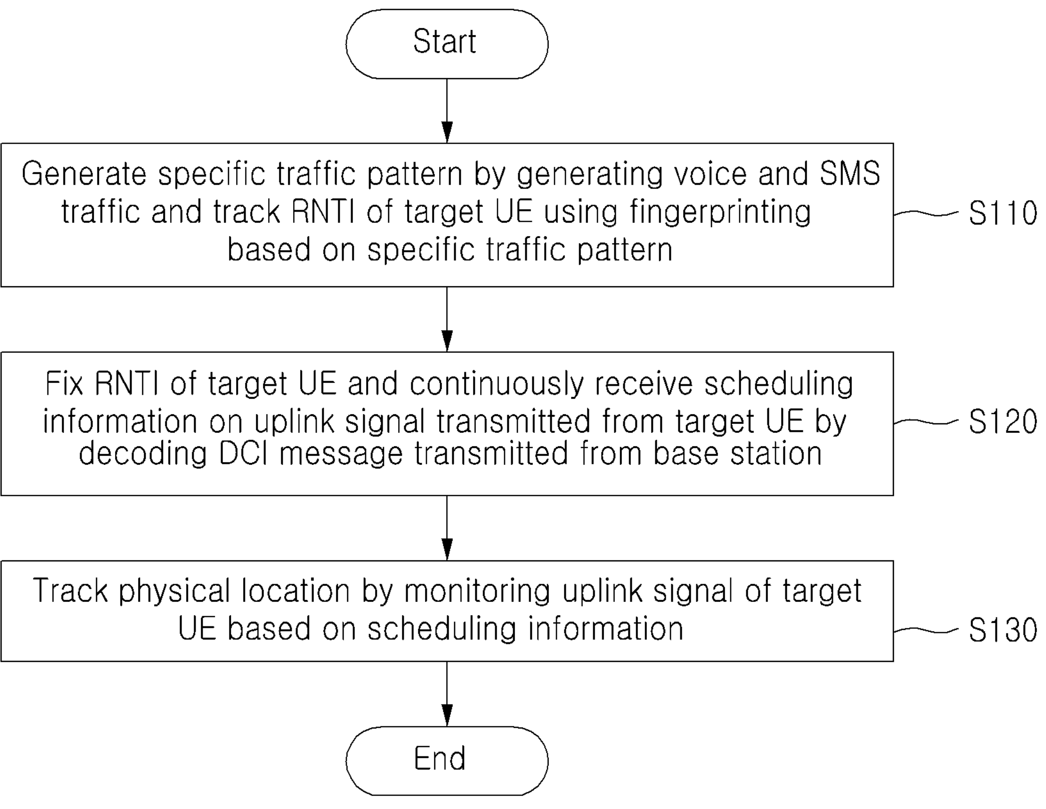
FIG. 1 is a flowchart illustrating a method of tracking a physical location of a user equipment (UE) in a mobile communication network according to an example embodiment.

Advantages and features of the present invention and methods of achieving the same will become clear with reference to the following example embodiments described in detail with the accompanying drawings. However, the present invention is not construed as being limited to the example embodiments disclosed below and will be implemented in various forms different from each other. The example embodiments are provided to make the disclosure of the present invention complete and to inform the scope of the present invention to one of ordinary skill in the art to which the present invention pertains and the present invention is only defined by the scope of the claims.

The terminology used herein is for the purpose of describing the example embodiments only and is not to be limiting the present invention. As used herein, the singular forms "a," "an," and "the" are intended to include the plural forms as well, unless the context clearly indicates otherwise. It will be further understood that the terms "comprises" and/or "comprising," when used in this specification, specify the presence of stated components steps, operations, and/or elements, but do not preclude the presence or addition of one or more other components, steps, operations, and/or elements.

Unless otherwise defined herein, all terms used herein (including technical or scientific terms) have the same meanings as those generally understood by one of ordinary skill in the art. Also, terms defined in dictionaries generally used should be construed to have meanings matching contextual meanings in the related art and are not to be construed as an ideal or excessively formal meaning unless otherwise defined herein.

Hereinafter, the example embodiments of the present invention will be described in detail with reference to the accompanying drawings. Like reference numerals refer to like components throughout and repeated description related thereto will be omitted.

FIG. 1 is a flowchart illustrating a method of tracking a physical location of a user equipment (UE) in a mobile communication network (hereinafter, also referred to as a physical location tracking method) according to an example embodiment.

Referring to FIG. 1, in operation S110, a specific traffic pattern is generated by generating voice and short message service (SMS) traffic and a radio network temporary identifier (RNTI) of a target UE is tracked using fingerprinting based on the specific traffic pattern.

Operation S110 may generate the specific traffic pattern by generating a plurality of packets that do not interfere with a service of a target for location tracking, such as silent SMS, spam SMS, and silent voice call, and may track the RNTI of the target UE by conducting fingerprinting based on the corresponding specific traffic pattern.

Also, the physical location tracking method according to an example embodiment may fix the RNTI of the target UE without separate privilege using vulnerabilities of mobile communication standards and may continuously generate an uplink signal of the target UE.

In operation S120, the physical location tracking method according to an example embodiment fixes the RNTI of the target UE and continuously receives scheduling information on an uplink signal transmitted from the target UE by decoding a downlink control information (DCI) message transmitted from a base station.

In general, a UE transmits a scheduling request (SR) message and a buffer status report (BSR) message to transmit uplink data and is allocated uplink resources through a DCI message from the base station. In the case of transmitting the SR message and the BSR message to the base station by being disguised as the target UE using the RNTI acquired in operation S110, the base station accepts this and continuously allocates resources, and maintains connection of the target UE. Here, due to maintained network connection, the RNTI of the target UE is fixed. Also, when resources are allocated to the target UE from the base station, the target UE continuously transmits uplink data using the corresponding resources although there is no transmission data in a buffer of the target UE.

Accordingly, operation S120 may specify and fix the RNTI of the target UE and may continuously acquire scheduling information on the uplink signal transmitted from the target UE by decoding the DCI message broadcasted from the base station.

In operation S130, a physical location is tracked by monitoring the uplink signal of the target UE based on the scheduling information.

Here, operation S130 may allow the target UE to continuously generate the uplink signal in a location tracking process and may specify the physical location by continuously monitoring the uplink signal of the target UE although the target UE does not use a mobile communication service.

Although not shown, the physical location tracking method according to an example embodiment may further include increasing signal power of the UE to a maximum level (23 dBm) of the UE only with RNTI information of the target UE without separate privilege, using vulnerabilities of mobile communication standards.

The above operation (not shown) may control the uplink signal transmitted from the target UE by controlling the DCI message in a radio channel based on the RNTI of the target UE and a configuration of the base station between operation S110 of tracking the RNTI of the target UE and operation S120.

In general, the base station uses a transmit power control (TPC) command within the DCI message to control uplink signal strength of the UE. Using this process, the RNTI of the target UE may be continuously acquired and the DCI message in the radio channel may be manipulated based on the corresponding RNTI and configuration of the base station.

The configuration of the base station may be acquired through downlink channel monitoring. A manipulated DCI message is generated by setting a TPC command value such that the target UE may change uplink signal strength and a DCI message signal manipulated with signaling timing (subframe unit: 1 millisecond) suitable for a downlink channel broadcasted from the base station is overwritten. Here, the manipulated DCI message signal needs to be received with stronger strength than a normal signal from the perspective of the target UE that receives the manipulated DCI message signal. When the target UE decodes the manipulated DCI message, it forcibly changes the uplink signal strength without the will of the base station or the UE. Accordingly, the present invention may improve probability and performance of location tracking by overcoming a shadow area of the target UE.

The above operation (not shown) may perform various manipulations, such as increasing signal strength of the target UE, forcibly manipulating scheduling of the target UE, and decreasing the signal strength of the target UE to be uncommunicable, through technology for forging the DCI message as described above. This is because the DCI message targeted by the present invention has various privileges related to controlling the mobile communication network.

Operation S130 of the physical location tracking method according to an example embodiment may distinguish a cellular repeater and the target UE by maximizing signal power of the target UE through the above operation (not shown). The above method is possible since the cellular repeater amplifies a signal with the power of the same strength at all times and thus, the target UE and the cellular repeater may be distinguished by monitoring a change width of signal strength when intentionally increasing the signal power of the target UE. Accordingly, the present invention may improve probability and performance of location tracking by overcoming cellular repeaters installed in various places.

Also, when preparation for tracking the physical location of the target UE is completed through the aforementioned process, the physical location tracking method according to an example embodiment may track a final physical location of the target UE with at least one location tracking method among Angle-of-Arrival (AoA), Time of Arrival (ToA), and Time Difference of Arrival (TDoA) through uplink/downlink monitoring in the mobile communication network through operation S130.

Therefore, the physical location tracking method according to an example embodiment may apply and utilize the aforementioned configuration to the existing invented location tracking systems or location tracking systems to be invented in the future. Also, practical location tracking may be performed when the present invention is applied to perform location tracking of a mobile communication terminal in a real environment.

FIG. 2 illustrates an unauthorized multi-angulation attack (UMA) according to an example embodiment.

Prior to describing FIG. 2, an attacker 400 that is a threat model is described and the unprivileged attacker 400 is considered herein.

The attacker 400 has no permission to acquire information of a victim (or a target UE 200) in a network infrastructure (e.g., evolved node base (eNB) 300 or a core network) or needs to install malware on a target device. The present invention assumes that the attacker 400 is aware of an online ID of the victim and cell information on which the victim is camping. This information may be acquired in advance using the existing presence test.

Rather than access a network and UE, the attacker 400 utilizes a plurality of devices that measure a signal direction of the target UE 200 using a directional antenna. Based on the devices, an aim is to find a physical location (i.e., 2D-coordinated) of the victim (target UE 200) by measuring a direction of an incident signal at a plurality of points. Also, such devices have capability of passively monitoring uplink and downlink long term evolution (LTE) signals, which is achievable using an off-the-shelf software-defined radio device (e.g., USRP) with an open-source LTE stack (e.g., srsRAN). One unique capability of the devices is an ability to actively inject malicious LTE signals (i.e., signal overshadowing) in both downlink and uplink channels.

The concept of the proposed unauthorized localization attack has distinct features compared to previously introduced physical localization works. First, the proposed attack considers a practical scenario in which an attacker may access only online ID information of a victim. Second, unlike previous works on physical localization that typically rely on passive monitoring, the attacker in the proposed attack exploits vulnerabilities in cellular network protocols. This allows the attacker to overcome restricted privileges and successfully track the victim's UE (target UE). Compared to passive approaches, the proposed attack involves an active operation of injecting malicious traffic. Specifically, it is demonstrated that the attacker may manipulate uplink scheduling of eNB and data transmission of the victim to improve localization performance by actively injecting uplink and downlink messages.

Unauthorized localization attack in a commercial network needs to address the following four challenges:

C1) An attacker needs to continuously acquire an RNTI of a victim using online identity of the victim.

C2) The attacker may track the victim only when uplink traffic of the victim is consistently generated.

C3) The attacker is unable to track the victim when a signal of the victim is undetectable.

C4) Presence of a cellular repeater may interfere with accurate determination of the victim's direction.

To investigate challenges of AoA-based unauthorized localization, a downlink/uplink channel sniffer is implemented based on a framework of physical localization. Then, the same is executed in an operational cellular network. Through this, an impact of each challenge on realizing unauthorized localization in real-world scenarios is assessed.

C1: Continuously acquiring an RNTI of a victim. Considering attack procedures for identifying a signal of the victim, a radio temporary identifier (i.e., RNTI) of the victim plays a key role. It is important to note that the RNTI is a temporary identifier that changes frequently, typically around 15 to 30 seconds. This characteristic has been empirically observed in both a commercial cellular network and an srsRAN environment. Whenever radio connection of the UE is disconnected and then re-established, a new RNTI is assigned to the UE. This represents that when the UE is not actively using any services for a certain period after connection, its radio connection is disconnected by the eNB and the previously assigned RNTI expires. When the UE subsequently requests the eNB for LTE services, a new RNTI value is assigned for radio communication.

The attacker encounters this challenge in identifying a location of the victim if their radio connection and RNTI are destroyed during a localization process. When radio connection of the victim UE is disconnected and the RNTI thereof expires, the attacker is required to wait for the victim to establish new radio connection. In addition, once connection of the victim is re-established, the attacker needs to track the RNTI of the victim once again to resume the localization process.

C2: High dependency on uplink transmission. It needs to be recalled that the main property the attacker exploits is monitoring an uplink signal generated by the UE of the victim. From this perspective, the attacker may launch localization only when the victim generates uplink traffic. That is, a localization attack may become very difficult when the victim is silent (i.e., no transmission of any signal). This high dependency on the uplink transmission limits the capability of the unauthorized localization attack. The attacker needs to passively wait for the uplink traffic of the victim with the sniffer since the attacker is not allowed to access the eNB or the victim UE.

C3: Undetectable signal of victim. Successful measurement of arrival signals at the sniffer of the attacker is critical for conducting a localization attack. However, if the sniffer fails to observe an uplink signal of the victim, it may be difficult to estimate a location of the victim. When the victim transmits the uplink signal with low power to the eNB, the attacker may not detect the signal of the victim. This issue often occurs to the attacker since the UE does not transmit the signal with high power at all times. The UE and the eNB control uplink transmission power of the UE according to 1) a location of the victim and 2) a behavior of the victim UE. Such conditions generate a shadow area in which the signal of the victim is not detectable. As a result, the sniffer suffers from the shadow area and the attacker eventually fails to conduct the attack, since they have no permission to control the uplink transmission power of the UE.

C4: Differentiating victim from repeater. A cellular repeater (also, referred to as a repeater) is a device that amplifies a received cellular signal in both downlink and uplink channels. The cellular repeater is widely used to enlarge service coverage of a cellular carrier. However, for the attacker, it becomes a challenging factor in determining a direction of the strongest signal. Since the repeater amplifies a weak signal of the victim, the sniffer may mistakenly target a location of the repeater (particularly, an external antenna) rather than a location of the victim. Therefore, the attacker needs to be able to distinguish which direction is towards a location of the UE. Despite severe impact on localization performance, none of the previous works have taken into account the influence of the cellular repeater.

Therefore, the physical location tracking method according to an example embodiment presents an unauthorized multi-angulation attack (UMA) that effectively addresses the aforementioned critical challenges of unauthorized localization. The UMA is an unauthorized localization attack, which utilizes AoA measurement with a directional antenna. The UMA includes four additional steps to effectively handle the challenges of unauthorized localization, in addition to the five basic steps of physical localization. The steps include 1) RNTI acquisition using online ID of the victim, 2) scheduling manipulation attack, 3) power boosting attack, and 4) defeating the cellular repeater.

The scheduling manipulation attack is specifically designed to address challenges C1 and C2, allowing the attacker to acquire the unexpired RNTI of the victim and to ensure continuous uplink transmission of the victim. To overcome challenges C3 and C4, the power boosting attack is employed, enabling the attacker to improve uplink signal strength of the attacker and to differentiate the signal of the victim from the signal of the repeater. Both attacks exploit vulnerable protocols in LTE specification, which lack implemented security protection measures. By utilizing these techniques, the UMA successfully solves major challenges associated with the unauthorized localization.

To determine a physical location of the victim UE (or target UE) 200, the UMA attacker 400 follows a systematic process as illustrated in FIG. 2. A first step is to trace an RNTI of the victim UE 200 using a phone number. This is achieved by transmitting (silent) voice call/SMS and by monitoring a traffic pattern on a downlink channel. Through this method, the attacker 400 may identify the RNTI of the victim UE 200 associated with the phone number. Then, the attacker 400 proceeds with a scheduling manipulation attack and transmits a fake scheduling request and reports a fake transmission buffer status to the eNB 300, by being disguised as the victim UE 200 with the RNTI. This attack ensures that the radio connection of the victim UE 200 remains active and the RNTI remains unexpired. Also, through the scheduling manipulation attack, the attacker 400 forces the victim UE 200 to generate uplink traffic even when there is no data available for transmission in a buffer. Subsequently, the attacker 400 conducts the power boosting attack and injects a manipulated TPC command into the victim UE 200, by being disguised as the eNB 300. Through this attack, the attacker 400 forces the victim UE 200 to increase the uplink transmission power up to a maximum level (23 dBm), overcoming practical challenges caused by an undetectable uplink signal of the victim UE 200 and the presence of a cellular repeater in a radio network. After performing such active operations, the attacker 400 acquires scheduling information of the victim UE 200 broadcasted over DCI 0 by monitoring a downlink channel. With this information, the attacker 400 identifies the uplink signal of the victim UE 200 in the uplink channel. Then, the attacker 400 measures AoA of the uplink signal of the victim UE 200 by rotating a directional antenna mounted on the sniffer.

A first step in the UMA is to acquire a temporary identifier (i.e., online ID) of a target used in the radio network. In conducting the attack, it is critical to be aware of an RNTI of the target. An eNB broadcasts uplink scheduling information to each UE and specifies a recipient UE using the RNTI. Therefore, an unprivileged attacker that desires to monitor and ascertain an uplink signal of a victim UE needs to be aware of an RNTI of the victim UE. Since the RNTI is designed to be decoupled with the online ID, the attacker is required to devise an approach that links the online ID of the UE to the RNTI.

Inspired by the prior works, the proposed approach for RNTI acquisition is to correlate voice/SMS traffic towards the victim to a monitored downlink packet denoted with an RNTI of a recipient. To this end, the present invention generates successive silent voice calls and transmit a silent SMS. Also, the present invention utilizes observation that traffic for control messages generated by incoming voice call and SMS is distinguished from user-plane data traffic.

RNTI acquisition is performed through the following three steps. First, Given the online identity of the victim, the attacker makes silent voice call or transmits silent SMS to the victim several times at constant time intervals. Second, The attacker monitors downlink traffic of SMS and voice call. Specifically, the attacker monitors a dedicated channel, called a bearer, used to transmit a control message of the voice call and the SMS. It is important to note that the attacker is able to monitor the targeted traffic clearly as each bearer is designed to deliver a different type of data. For example, a message for controlling the voice call is delivered over a bearer named data radio bearer (DRB) 1 and user-plane traffic and an SMS control message are delivered through DRB 2 and signaling radio bearer (SRB), respectively. Third, The attacker examines radio connection and finds out connection showing the intended traffic. Finally, the attacker determines an RNTI of the corresponding connection as belonging to the victim.

Figure 3:
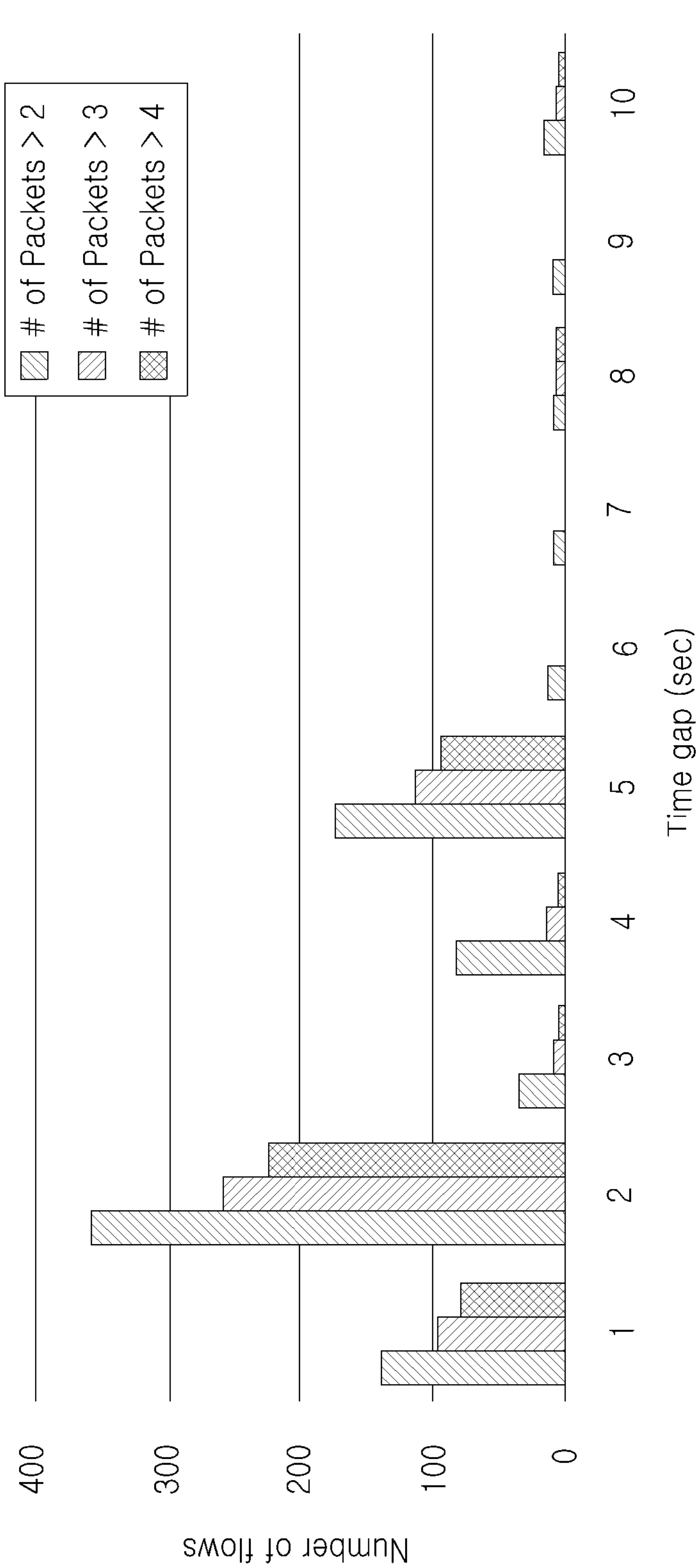
FIG. 3 illustrates a traffic pattern histogram according to an example embodiment.

FIG. 3 illustrates a traffic pattern histogram according to an example embodiment.

To demonstrate feasibility of the proposed procedure, the present invention implements the procedure in a crowded commercial network and verifies the feasibility.

The present invention uses a simple heuristic to select a) the number of messages and b) a time gap between messages. To this end, the present invention analyzes a traffic dataset to verify how the traffic of ordinary users' SMS/call reception looks in the wild. The traffic dataset contains over 4 hours of downlink traffic in two commercial LTE mobile network operators in two countries and has 10 to 60 active users connected to eNB and 2,142 radio connections in total. The present invention mainly monitors SRB 2 and DRB 1, bearers for signaling message transmission of SMS notifications and counts the number of flows according to the number of messages and a constant time gap between the messages. In calculating a time gap between packets, the difference between the arrival time of packets (i.e., timestamps) is rounded off in seconds, considering packet delay. For ethical consideration, there is no attempt to decrypt a packet or track user information.

Referring to FIG. 3, most flows do not have a traffic pattern with a plurality of messages/calls with a time gap of over 6 seconds. This result represents that an attacker may identify a flow of a target victim by carefully designing a transmission strategy for a distinctive traffic pattern. For example, the attacker may design the traffic pattern to have over three message/call trials with 6 seconds of time gap.

Given the traffic pattern and online ID of the target, an RNTI acquisition process is performed in a crowded commercial network with a total of 862 active users detected over an hour. For this, COTS devices, particularly, iPhone 14 Pro and Samsung Galaxy S10 5G are used as a sender and a receiver, respectively. While transmitting messages, downlink traffic is collected and SRB 2 packets are monitored to identify the traffic pattern of the target. Upon performing an examination ten times, it is determined that RNTIs of the target are distinguishable from others, with a 100% success rate.

Figure 4:
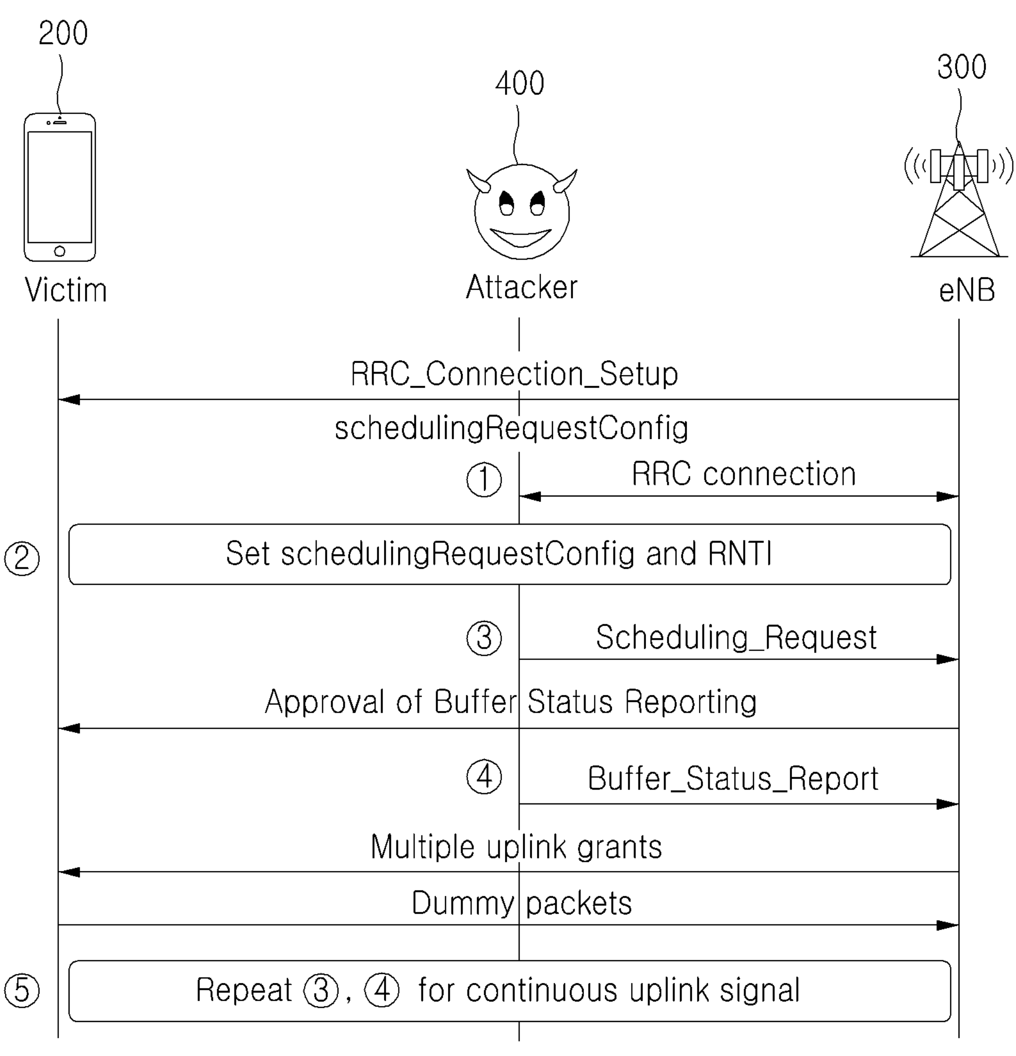
FIG. 4 illustrates a procedure flowchart of a scheduling manipulation attack according to an example embodiment.

FIG. 4 illustrates a procedure flowchart of a scheduling manipulation attack according to an example embodiment.

One of cores of UMA is the ability to a) force a victim to generate uplink transmission and b) maintain an obtained radio identifier (RNTI) of the victim. To this end, the present invention comes up with a novel approach called a scheduling manipulation attack.

Basically, the scheduling manipulation attack injects a manipulated message into eNB in which the message eventually makes the eNB schedule resources for uplink transmission to a victim UE and induces the victim UE (or target UE) to transmit uplink data. Through this, this attack prevents the UE from becoming idle and maintains the obtained radio identifier (i.e., RNTI) of the victim UE from online ID of the victim.

A method of controlling uplink data transmission of the UE through an uplink scheduling procedure is described. Basically, the UE is allowed to transmit uplink data only when the UE has an uplink grant allocated by the eNB. The UE performs the following procedure to acquire the uplink grant for data transmission to the eNB. Initially, the UE transmits a scheduling request informing the eNB that the UE has uplink data towards the eNB. After receiving the scheduling request, the eNB then approves a BSR of the UE, which is used to report an uplink data size. Finally, the UE triggers the BSR and acquires sufficient uplink grants to transmit data from the eNB.

The scheduling request (SR) is a PHY layer message transmitted from the UE to the eNB over physical uplink control channel (PUCCH). To transmit the SR to the eNB, the UE uses schedulingRequestConfig previously shared over an RRC connection setup message. schedulingRequestConfig notifies each UE of which resource needs to be used to transmit the scheduling request.

The buffer status report (BSR) is a MAC layer message transmitted over physical uplink shared channel (PUSCH) to inform the eNB of an amount of data waiting for transmission in a buffer of the UE. After receiving the BSR, the eNB transmits a plurality of uplink grants to the UE, sufficient for the UE to transmit data.

The approach of the present invention exploits the scheduling request (SR) and the BSR to trigger unintended uplink transmission and to maintain unexpired radio connection. The scheduling request and the BSR are controlled by PHY and MAC layers without any security protection (i.e., encryption or integrity check). A key idea is to manipulate uplink scheduling by forging an uplink channel of the victim and to induce the eNB to allocate an uplink grant to the victim, although the UE has no uplink data to transmit. The proposed approach may be realized by performing the following three concrete steps as illustrated in FIG. 4.

In a first step (①), a user-dedicated radio configuration is acquired. The UMA attacker 400 identifies a user-dedicated radio configuration of the victim UE (or target UE) 200. The user-dedicated radio configuration including schedulingRequestConfig is notified to each UE 200 by the eNB 300 when radio connection is established (in an RRC connection setup message). The attacker 400 may identify a configuration of the victim UE 200 by monitoring RRC connection setup when the victim UE 200 attempts to establish a radio connection with the eNB 300.

In a second step (②), a forged uplink channel is established. The UMA attacker 400 forges the uplink channel of the victim UE 200 using the obtained radio configuration and RNTI of the victim UE 200. Initially, the attacker 400 establishes a radio connection with the eNB 300 to generate a communication channel. Then, the attacker 400 sets RNTI and schedulingRequestConfig with the same value as the victim UE 200. Based on this setting, the attacker 400 acquires the communication channel of the victim UE 200.

In a third step, uplink scheduling is manipulated. After acquiring the communication channel of the victim UE 200, the UMA attacker 400 injects a fake uplink scheduling request and a fake BSR into the eNB 300 to manipulate uplink scheduling. First (③), the fake uplink scheduling request is transmitted through resources of the victim UE 200 on PUCCH, which is acquired by forging the uplink channel of the victim UE 200. Then, the eNB 300 allocates uplink resources to an RNTI of the victim UE 200 on PUSCH. Second (④), to obtain a plurality of uplink grants, the attacker 400 transmits the fake BSR over the allocated resources through the fake uplink scheduling request. The fake BSR includes a) the RNTI of the victim UE 200, b) a required buffer size, and c) a logical channel ID (LCID). In this attack, the required buffer size is set to 200 bytes. The LCID has a value of 3 indicating data bearer communication in an uplink logical channel. The attacker 400 repeatably performs the above process such that the eNB 300 continuously allocates the uplink grant to the victim UE 200 (⑤). Here, the manipulated scheduling request and BSR are transmitted only using 10% of allocated uplink resources to minimize an impact on quality of service (QOS) of the victim UE 200.

To demonstrate the feasibility of the scheduling manipulation attack in UMA, the present invention implements the aforementioned steps using srsUE in srsRAN and USRP X310. The present invention performs two evaluations in a testbed built with srsRAN and USRP B210. In both evaluations, a COTS device, Samsung Galaxy Note FE, is used and all applications including background processing on a UE are disabled to prevent the UE rom requesting uplink grants during the attack.

First, when uplink grants are allocated by eNB, whether the victim UE generates uplink traffic despite no data available for transmission is examined. To inspect uplink transmission of the UE transparently, the evaluation is performed in the testbed, collecting uplink packets of a MAC layer at srsENB. As a result, dummy data from the victim is detected in the MAC layer at the eNB. Therefore, it is verified that the UE transmits uplink traffic to the eNB even when an unintended uplink grant is allocated through the manipulated scheduling request and BSR.

Second, whether an RNTI of the victim remains unchanged while manipulating uplink scheduling in the same testbed is examined. During the attack, a radio status of the UE is monitored using a diagnostic monitoring tool. As a result, through the scheduling manipulation attack, the radio connection between the UE and the eNB is consistently maintained and the RNTI of the target UE remains unchanged.

Accordingly, the scheduling manipulation attack allows the UMA attacker to identify a physical location of the victim without interruption caused by radio disconnection or RNTI change, as well as ensuring the presence of uplink signals from the victim.

Figure 5:
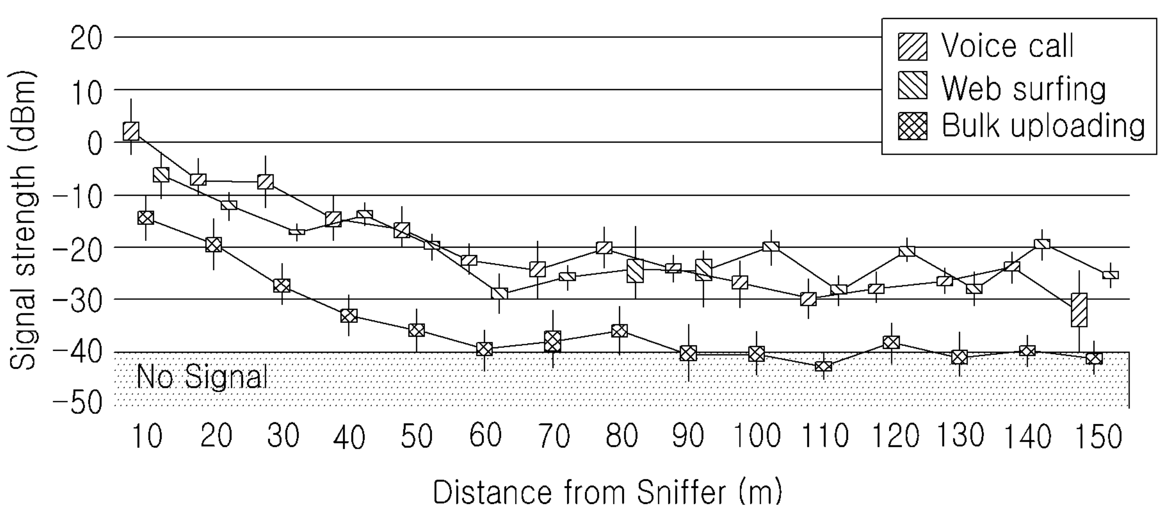
FIG. 5 is a graph showing arrival signal strength by a behavior of a target UE according to an example embodiment.
Figure 6:
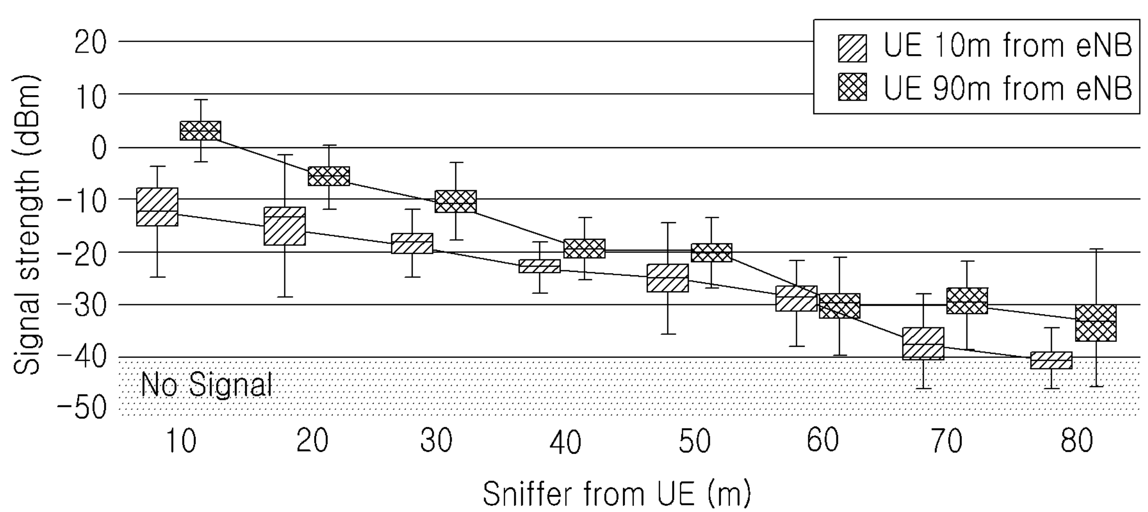
FIG. 6 is a graph showing arrival signal strength according to a distance between a target UE and an attacker according to an example embodiment.

FIG. 5 is a graph showing arrival signal strength by a behavior of a target UE according to an example embodiment, and FIG. 6 is a graph showing arrival signal strength according to a distance between a target UE and an attacker according to an example embodiment.

The present invention presents a novel approach called a power boosting attack to enforce a UE to increase uplink transmission power of the UE. This attack is required to overcome a shadow area in which a signal of a victim is undetectable to a localization attacker. Initially, when and how the localization attacker suffers from the shadow area is investigated by analyzing various scenarios with the UE and a sniffer of the attacker in a commercial cellular network. The present invention presents a method of obtaining, by UMA, benefits from the power boosting attack through a design and an evaluation using AMARI Callbox testbed.

The shadow area is a location at which the attacker may not detect an uplink signal of the victim. This shadow area is undoubtedly a significant obstacle to the localization attacker. If the sniffer fails to observe the uplink signal of the victim, estimation of the victim's location may also fail. Intuitively, the shadow area is mainly determined by uplink data transmission strength of the victim.

The present invention investigates two potential factors that determine uplink transmission power of the UE: 1) behavior of the UE and 2) location of the UE. The two factors stem from the following intuitions. First, depending on an LTE service (e.g., voice call or video streaming) that the UE is currently using, the UE determines to transmit signals with different uplink transmission power. Specifically, LTE ensures dedicated QoS for each service and the UE adjusts its transmission power accordingly. Second, the UE also adjusts the uplink transmission power to compensate for signal path loss that occurs due to factors, such as distance and obstacle, in coordination with the eNB. According to a free space propagation model, the signal path loss is proportional to the square of a signal traveling distance.

To confirm the impact of the aforementioned factors on transmission power and the resulting shadow area, the uplink transmission power of the UE is measured. During each measurement, the transmission power of uplink signals of the UE is collected for 10 seconds within commercial cell coverage of an urban environment.

First, when the UE is using an LTE service at 30 m away from the eNB, the average uplink transmission power is measured. The present invention sets three types of user behavior, for example, bulk uploading, web surfing, and voice call. For the bulk uploading behavior, the UE is set to generate large-scale uplink data throughput. For the web surfing behavior, the UE is set to visit one of Alexa Top 50 sites every 2 seconds for relatively low uplink data throughput.

Second, the average of uplink transmission power and reference signals received power (RSRP) is measured, which indicates signal path loss of a radio channel according to a distance between the UE and the eNB.

[Table 1] shows the uplink transmission power with respect to the behavior of the UE. It is observed that the transmission power is highest when the UE is using a bulk uploading service. On the other hand, web surfing shows the lowest transmission power due to its low data throughput. Therefore, according to a current service that the target victim is using, the resulting shadow area may vary.

TABLE 1

| | Voice call | Web surfing | Bulk uploading |
|---|---|---|---|
| Tx power (dBm) | −0.83 | −6.5 | 17.68 |

TABLE 2

| Distance (m) | 10 | 20 | 30 | 40 | 50 | 60 | 70 | 80 | 90 | 100 | 110 |
|---|---|---|---|---|---|---|---|---|---|---|---|
| Tx PWR (dBm) | −7.04 | −10.64 | 0.49 | 4.74 | 5.05 | 4.33 | 7.65 | 7.45 | 7.2 | 7.39 | 7.56 |
| RSRP (dBm) | −62.37 | −62.63 | −73.43 | −76.66 | −78.91 | −81.69 | −85.36 | −85.51 | −86.45 | −84.23 | −87.6 |

[Table 2] shows the uplink transmission power depending on a location of the UE. The UE transmits its uplink data with higher power as a distance from the eNB increases. This is because the further the UE is away from the eNB, the lower RSRP (i.e., higher signal path loss) is measured at the UE side. The UE transmits its uplink data with stronger power considering the signal path loss. Not only signal path loss from the traveling distance but also interference and obstacles may affect the uplink transmission power of the UE.

When the victim is using a specific service that requires low signal power or is located close to the eNB, the victim may be located in the shadow area to the attacker. As shown in the experiments, the UE adopts different transmission power according to the UE's current behavior and relative location to the eNB. This directly affects performance of a localization attack. Unlike the eNB, these are critical issues to the attacker that does not have permission to dynamically control the uplink transmission power of the target UE.

Here, the present invention investigates how a location and behavior of the UE are reflected in signal detection of the sniffer, which may cause failure in the localization attack. To this end, the present invention measures the arrival signal strength at the sniffer, which runs on a 10 MHz bandwidth LTE channel in 800 MHz band. A COTS device is used as the UE of the victim. Both the UE and the sniffer are connected to a commercial network and located within the same commercial cell coverage in the urban environment. In this experiment, a parabolic antenna mounted on the sniffer is set to direct towards the UE. To calculate the signal strength, the average of the monitored strength at the sniffer over 2,000 subframes during each measurement trial is used.

Initially, examined is the impact of the UE's behavior on the sniffer of the attacker, the UE using the three behaviors employed in the previous experiment (i.e., voice call, web surfing, and bulk uploading). In this experiment, the sniffer is placed 45 m away from the eNB. Then, the arrival signal strength is measured by moving the UE from 10 m to 150 m away from the sniffer at intervals of 10 m.

FIG. 5 shows the measured signal strength at the sniffer of the attacker over three types of the UE's behavior. A "No Signal" portion in FIG. 5 represents a detection threshold, which is determined by measuring signal strength when there are no uplink signals. The sniffer of the attacker easily detects the uplink signals when the UE is performing bulk uploading or making a voice call. On the other hand, the measured signal strength during web surfing is lower than the others, which causes the attacker to fail in detecting a signal when the UE is more than 60 m away from the sniffer.

Then, the impact of the UE's location on the attacker is investigated by running two evaluations. First, a case in which the UE is located far from the eNB is considered. The UE is placed 90 m away from the eNB. Then, the sniffer is placed in the middle of the eNB and the UE. The sniffer measures the arrival signal strength every 10 m between the eNB and the UE.

Second, a case in which the UE is located close to the eNB is considered, in contrast to the first case. To this end, herein, the UE is placed 10 m away from the eNB. The sniffer is located 20 m from the eNB, which is 10 m from the UE. Then, the signal strength is measured at the sniffer by placing the sniffer every 10 m up to 80 m from the UE. In both cases, the UE is set to use a voice call.

FIG. 6 shows the measured signal strength at the sniffer. When the UE is far from the eNB (UE 90 m from the eNB), the sniffer of the attacker is able to detect an uplink signal of the victim well, up to 80 m away from the UE. However, when the UE is close to the eNB (UE 10 m from the eNB), and here, the sniffer is located more than 70 m away from the UE, the sniffer may no longer detect an uplink signal of the UE. This is because the UE transmits its uplink data with lower signal power when the UE is located close to the eNB.

It is verified that the behavior and the location of the UE generate the shadow area for the sniffer of the attacker and thus, the attacker eventually fails to identify the location of the victim.

There may be an argument that enforcing the victim to use a specific service of requiring high uplink data throughput solves those problems. However, the attacker does not have any permission to control the UE of the victim or network infrastructure. Therefore, none of the previous works has considered the shadow area issue and provided an effective solution.

In order to overcome the shadow area, the UMA adopts a power boosting attack, which enforces the victim UE to increase its uplink transmission power. This attack leverages a transmission power control mechanism managed by the eNB.

The eNB is responsible for all aspects of data transmission with connected UEs. Along with data transmission scheduling, the eNB also controls the data transmission power of the UE by TPC command included in DCI 0 messages. The UE adjusts its transmission power based on an internal power control algorithm that uses a designated value in the TPC command along with current self-monitored channel quality. One widely used algorithm adopts the accumulated power control that gradually adjusts the transmission power according to the TPC command as defined in [Table 3] with a maximum power of 23 dBm.

TABLE 3

| TPC command in DCI 0 | 0 | 1 | 2 | 3 |
|---|---|---|---|---|
| Accumulated $\Delta_{PUSCH}$ (dB) | −1 | 0 | +1 | +3 |

A novel approach of the present invention that changes uplink transmission power of a target UE without any privilege is to utilize the TPC command. The TPC command is delivered over DCI 0 message without any security protection (i.e., encryption or integrity check). That is, the TPC command is exposed to a downlink overshadowing attack. The key idea is to inject a manipulated subframe that contains DCI 0 broadcast to the victim UE of which TPC is set to increase transmission power of the victim UE. This power boosting attack may be realized by following three concrete steps.

In a first step, a configuration for radio communication is acquired. To identify a structure of a legitimate downlink subframe, the UMA attacker retrieves a physical configuration of a target eNB. This configuration includes target physical cell identification (PCI), channel bandwidth, physical channel HybridARQ indicator channel (PHICH) configuration, cyclic prefix, and transmission mode of the eNB. This may be retrieved by decoding messages that the eNB broadcasts, such as a master information block (MIB), a primary synchronization signal (PSS), and a secondary synchronization signal (SSS).

In a second step, a subframe is manipulated. The UMA attacker manipulates the subframe that includes a malicious DCI 0 message using the obtained physical configuration. The manipulated DCI 0 messages then includes a) an RNTI of the victim, b) arbitrary scheduled uplink transmission information, and c) the TPC command having a value of 3 to boost the uplink transmission power.

In a third step, the manipulated subframe is overshadowed. By extending the signal overshadowing attack, the UMA attacker injects the manipulated subframe with a proper subframe number over PDCCH. More specifically, the present invention mainly modifies a subframe construction logic of SigOver attack and uses almost the same logic for injecting the resulting subframe. In this work, the present invention injects the manipulated subframe to overshadow every legitimate subframe that has index number 9. This is mainly because 1) the present invention desires to minimize the impact on QoS of the victim and 2) there is a race condition with the eNB. Also, as the eNB tries to adjust the uplink transmission power of the UE, the UE decreases its power whenever the UE receives the DCI 0 message from the eNB through remaining subframes. Therefore, the present invention repeatedly performs the overshadowing attack with the manipulated subframe.

To demonstrate the effectiveness of the power boosting attack in the UMA, the present invention implements the above power boosting attack using srsRAN and USRP X310. Through this, evaluation is performed in AMARI Callbox testbed.

The present invention examines whether the TPC injection actually works. Here, COTS devices, Samsung Galaxy S10 5G and Galaxy Note FE, are used for the experiments. During the attack, the transmission power of the UE is measured using a diagnostic monitoring tool. As a result, through the power boosting attack, it is verified that the transmission power of the UE increases up to 23 dBm (i.e., maximum transmission power) during voice call. Considering the average transmission power of the UE presented in Table 2, it is feasible to overcome the shadow area by increasing the transmission power to 23 dBm through the power boosting attack.

This result represents that the power boosting attack enables the UMA to more effectively identify a physical location of the victim by removing the shadow area in which the localization attacker fails.

Figure 7:
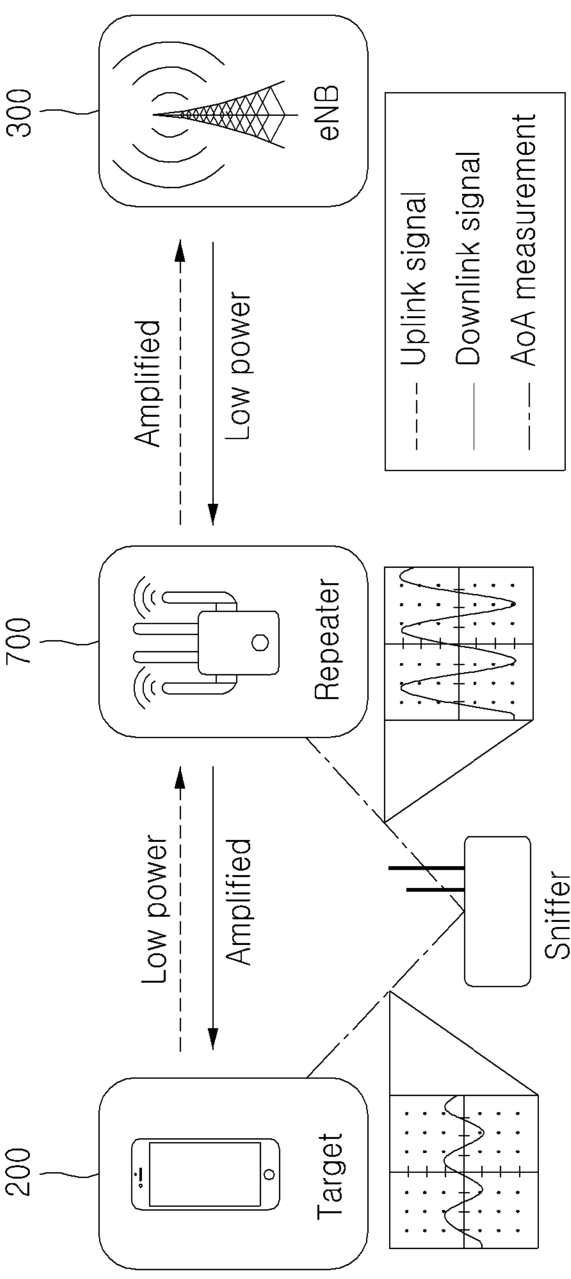
FIG. 7 illustrates influence of a cellular repeater in a localized attack according to an example embodiment.

FIG. 7 illustrates influence of a cellular repeater in a localized attack according to an example embodiment.

A cellular repeater 700, one of practical factors in a cellular network, which improves channel quality between the eNB 300 and the target UE 200, needs to be considered for physical localization.

A cellular repeater is designed to reduce signal path loss between eNB and a UE by amplifying downlink and uplink signals. By operation of the repeater, the UE may transmit uplink data with low signal power due to reduced signal path loss. Here, the repeater transmits (i.e., relays) the data with amplified high signal power.

To demonstrate the effect of the repeater in a radio network, the impact of the cellular repeater on transmission power of the UE in the commercial network is investigated. Also, a practical challenge caused by the cellular repeater during the localization attack is investigated.

Transmission power of the UE. Initially, impact of the repeater on transmission power of the UE is investigated. In this experiment, a commercial cellular repeater and a COTS device, Galaxy S10, are placed inside a building. Here, the UE is 10 m away from the repeater and an external antenna of the repeater is installed outside a window. Then, RSRP and transmission power are measured at the UE side when the repeater works and when the repeater does not work, respectively.

As a result, it is confirmed that an operation of the repeater increases RSRP approximately 10 dBm and decreases the transmission power of the UE approximately 5 dBm. This result represents that the repeater makes the target UE transmit uplink data with lower signal power by decreasing signal path loss of a cellular radio network.

The present invention places the repeater 700 and the target UE 200 inside the building. In addition, the sniffer is placed 30 m away from the building. Then, the arrival signal strength is measured in a direction of each of the target UE 200 and the external antenna of the repeater 700. As a result, the arrival signal strength in the direction of the target UE 200 is measured as −25 dBm. In the direction of the repeater 700, the signal strength equivalent to −17 dBm is measured.

This result represents that an attacker conducting a localization attack may fail localization tracking in an environment in which a cellular repeater is installed. The attacker may estimate a location of the repeater (more specifically, an external antenna of the repeater) as a location of a victim due to the stronger signal generated by the repeater as shown in FIG. 7.

By employing the power boosting attack, introduced is a simple and practical method to locate the victim UE in the presence of the cellular repeater. Here, the key idea is to analyze power of a monitored signal before and after conducting the power boosting attack.

To differentiate a signal of the victim from a signal of the repeater, the UMA utilizes characteristics of the repeater and the power boosting attack. The cellular repeater is designed to boost the input signal power to its maximum capacity for signal amplification to improve the LTE channel quality. Due to this characteristic, even after conducting the power boosting attack, an uplink signal amplified by the repeater may be the same. On the other hand, an uplink signal of the victim may be amplified due to the power boosting attack. Therefore, the attacker may differentiate the signal of the victim UE from the amplified signal of the repeater by conducting the power boosting attack and by observing a contrasting increase in signal strength between the two entities.

This strategy is possible due to the different operational logic of the UE and the repeater. The repeater is a passive network component that simply amplifies the input signal with its maximum output power and then relays the amplified signal. On the other hand, the UE dynamically adjusts its uplink transmission power depending on signal path loss and data throughput. Therefore, a corresponding action of the UE and that of the repeater to power boosting vary, which enables the attacker to identify the signal of the victim.

In this context, the attacker performs the following procedures. First, the attacker injects a manipulated TPC command having a value of 3 over DCI 0 message. Second, both the victim UE and the repeater receive the corresponding message. Third, the victim UE increases the uplink signal strength, but the repeater does not increase the uplink signal strength since the repeater already transmits the uplink signal with highest power. As a result, it leads to increasing the arrival signal strength only on the victim UE side, as observed from perspective of the sniffer ([Table 4]). Based on this strategy, the UMA attacker may correctly determine a direction of the victim UE, overcoming a practical challenge posed due to the presence of the cellular repeater.

TABLE 4

| TPC injection | Off | | On | |
|---|---|---|---|---|
| Target | UE | Repeater | UE | Repeater |
| Signal strength (dBm) | Weak | Strong | Increased | Static |

To confirm the feasibility of the proposed strategy, the present invention performs a measurement evaluation. Transmission power of the repeater depending on the input signal power by the sniffer is measured. This evaluation aims to investigate impact of an increase in the transmission power of the UE on amplification output of the repeater and view of the attacker. The experiments of the present invention focus on demonstrating the feasibility by passively monitoring the signal strength of only devices of the present invention with the sniffer, without direct injection of a manipulated packet in the commercial network. This approach is adopted to ensure ethical compliance within legal boundary.

The present invention sets the UE to use two different behaviors, web surfing and voice call, to implicitly reflect the signal power before and after the power boosting attack. As described above, the uplink transmission power of the UE varies depending on a behavior of the UE. Therefore, the present invention measures the arrival signal strength in the direction of the repeater using the sniffer while increasing the transmission power of the UE. As a result, it is observed that, in both user behaviors, the arrival signal strength in the direction of the repeater remains un-changed. This result represents that, even after conducting the power boosting attack, the arrival signal strength only in the direction of the victim significantly increases, while the arrival signal strength in the direction of the repeater remains unchanged (static).

Accordingly, through the observation of an increase in arrival signal strength using a directional antenna after conducting the power boosting attack, the UMA attacker may distinguish a location of the target UE 200 from that of the repeater 700.

Figure 8:
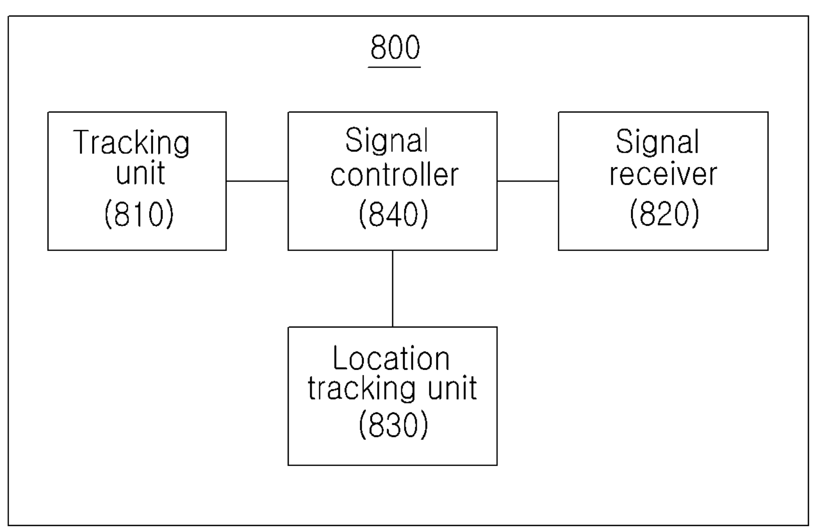
FIG. 8 is a diagram illustrating a configuration of a system for tracking a physical location of a UE in a mobile communication network according to an example embodiment.

FIG. 8 is a diagram illustrating a configuration of a system for tracking a physical location of a UE in a mobile communication network according to an example embodiment.

Referring to FIG. 8, a system for tracking a physical location of a UE 800 (hereinafter, also referred to as a physical location tracking system 800) according to an example embodiment may include a tracking unit 810, a signal receiver 820, and a location tracking unit 830, and may further include a signal controller 840.

The tracking unit 810 generates a specific traffic pattern by generating voice and SMS traffic and tracks an RNTI of a target UE using fingerprinting based on the specific traffic pattern.

The tracking unit 810 may generate the specific traffic pattern by generating a plurality of packets that do not interfere with a service of a target for location tracking, such as silent SMS, spam SMS, and silent voice call, and may track the RNTI of the target UE by conducting fingerprinting based on the corresponding specific traffic pattern.

Also, the physical location tracking system 800 according to an example embodiment may fix the RNTI of the target UE without separate privilege using vulnerabilities of mobile communication standards and may continuously generate an uplink signal of the target UE.

The signal receiver 820 fixes the RNTI of the target UE and continuously receives scheduling information on an uplink signal transmitted from the target UE by decoding a DCI message transmitted from a base station.

In general, a UE transmits a scheduling request (SR) message and a buffer status report (BSR) message to transmit uplink data and is allocated uplink resources through a DCI message from the base station. In the case of transmitting the SR message and the BSR message to the base station by being disguised as the target UE using the RNTI acquired by the tracking unit 810, the base station accepts this and continuously allocates resources, and maintains connection of the target UE. Here, due to maintained network connection, the RNTI of the target UE is fixed. Also, when resources are allocated to the target UE from the base station, the target UE continuously transmits uplink data using the corresponding resources although there is no transmission data in a buffer of the target UE.

Accordingly, the signal receiver 820 may specify and fix the RNTI of the target UE and may continuously acquire scheduling information on the uplink signal transmitted from the target UE by decoding the DCI message broadcasted from the base station.

The location tracking unit 830 tracks a physical location by monitoring the uplink signal of the target UE based on the scheduling information.

Here, the location tracking unit 830 may allow the target UE to continuously generate the uplink signal in a location tracking process and may specify the physical location by continuously monitoring the uplink signal of the target UE although the target UE does not use a mobile communication service.

The physical location tracking system 800 according to an example embodiment may further include the signal controller 840 configured to increase signal power of the UE to a maximum level (23 dBm) of the UE only with RNTI information of the target UE without separate privilege, using vulnerabilities of mobile communication standards.

The signal controller 840 may control the uplink signal transmitted from the target UE by manipulating the DCI message in a radio channel based on the RNTI of the target UE and a configuration of the base station between the tracking unit 810 configured to track the RNTI of the target UE and the signal receiver 820.

In general, the base station uses a TPC command within the DCI message to control uplink signal strength of the UE. Using this process, the RNTI of the target UE may be continuously acquired and the DCI message in the radio channel may be manipulated based on the corresponding RNTI and configuration of the base station.

The configuration of the base station may be acquired through downlink channel monitoring. A manipulated DCI message is generated by setting a TPC command value such that the target UE may change uplink signal strength and a DCI message signal manipulated with signaling timing (subframe unit: 1 millisecond) suitable for a downlink channel broadcasted from the base station is overwritten. Here, the manipulated DCI message signal needs to be received with stronger strength than a normal signal from the perspective of the target UE that receives the manipulated DCI message signal. When the target UE decodes the manipulated DCI message, it forcibly changes the uplink signal strength without the will of the base station or the UE. Accordingly, the present invention may improve probability and performance of location tracking by overcoming a shadow area of the target UE.

The signal controller 840 may perform various manipulations, such as increasing signal strength of the target UE, forcibly manipulating scheduling of the target UE, and decreasing the signal strength of the target UE to be uncommunicable through technology for forging the DCI message as described above. This is because the DCI message targeted by the present invention has various privileges related to controlling the mobile communication network.

The location tracking unit 830 of the physical location tracking system 800 according to an example embodiment may distinguish a cellular repeater and the target UE by maximizing signal power of the target UE through the signal controller 840. The above method is possible since the cellular repeater amplifies a signal with the power of the same strength at all times and thus, the target UE and the cellular repeater may be distinguished by monitoring a change width of signal strength when intentionally increasing the signal power of the target UE. Accordingly, the present invention may improve probability and performance of location tracking by overcoming cellular repeaters installed in various places.

Also, when preparation for tracking the physical location of the target UE is completed through the aforementioned process, the physical location tracking system 800 according to an example embodiment may track a final physical location of the target UE with at least one location tracking method among AoA, ToA, and Time TDoA through uplink/downlink monitoring in the mobile communication network through the location tracking unit 830.

Therefore, the physical location tracking system 800 according to an example embodiment may apply and utilize the aforementioned configuration to the existing invented location tracking systems or location tracking systems to be invented in the future. Also, practical location tracking may be performed when the present invention is applied to perform location tracking of a mobile communication terminal in a real environment.

Although the description is omitted in the system of FIG. 8, it is apparent to one of ordinary skill in the art that each component of FIG. 8 may include all the contents described with reference to FIGS. 1 to 7.

The systems or the apparatuses described herein may be implemented using hardware components, software components, and/or combinations thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be permanently or temporarily embodied in any type of machine, component, physical equipment, virtual equipment, a computer storage medium or device, or a signal wave to be transmitted, to be interpreted by the processing device or to provide an instruction or data to the processing device. The software also may be distributed over network coupled computer systems so that the software is stored and executed in a distributed fashion. The software and data may be stored by one or more computer readable storage media.

The methods according to the example embodiments may be configured in a form of program instructions performed through various computer devices and recorded in non-transitory computer-readable media. The media may also include, alone or in combination with the program instructions, data files, data structures, and the like. The program instructions recorded in the media may be specially designed and configured for the example embodiments or may be known to those skilled in the computer software art and thereby available. Examples of the media include magnetic media such as hard disks, floppy disks, and magnetic tapes; optical media such as CD-ROM and DVDs; magneto-optical media such as floptical disks; and hardware devices that are specially configured to store program instructions, such as read-only memory (ROM), random access memory (RAM), flash memory, and the like. Examples of program instructions include both machine code, such as produced by a compiler, and files containing a higher level code that may be executed by the computer using an interpreter. The hardware device may be configured to operate as at least one software module, or vice versa.

While the example embodiments are described with reference to specific example embodiments and drawings, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, or replaced or supplemented by other components or their equivalents.

Therefore, other implementations, other example embodiments, and equivalents of the claims are to be construed as being included in the claims.

What is claimed is:

1. A method of tracking a physical location of a user equipment (UE) in a mobile communication network, the method comprising:

generating a specific traffic pattern by generating voice and short message service (SMS) traffic and tracking a radio network traffic identifier (RNTI) of a target UE using fingerprinting based on the specific traffic pattern;

fixing the RNTI of the target UE and continuously receiving scheduling information on an uplink signal transmitted from the target UE by decoding a downlink control information (DCI) message transmitted from a base station; and tracking a physical location by monitoring the uplink signal of the target UE based on the scheduling information;

wherein the tracking of the physical location comprises allowing the target UE to continuously generate the uplink signal in a location tracking process and specifying the physical location by monitoring the uplink signal of the target UE when the target UE does not use a mobile communication service.

2. The method of claim 1, wherein the tracking of the RNTI of the target UE comprises generating the specific traffic pattern by generating a plurality of packets that do not interfere with a service of a target for location tracking, including a silent SMS, a spam SMS, and a silent voice call.

3. A method of tracking a physical location of a user equipment (UE) in a mobile communication network, the method comprising:

generating a specific traffic pattern by generating voice and short message service (SMS) traffic and tracking a radio network traffic identifier (RNTI) of a target UE using fingerprinting based on the specific traffic pattern;

fixing the RNTI of the target UE and continuously receiving scheduling information on an uplink signal transmitted from the target UE by decoding a downlink control information (DCI) message transmitted from a base station;

tracking a physical location by monitoring the uplink signal of the target UE based on the scheduling information; and controlling the uplink signal transmitted from the target UE by manipulating the DCI message in a radio channel based on the RNTI of the target UE and a configuration of the base station after tracking the RNTI of the target UE.

4. The method of claim 3, wherein the controlling of the uplink signal comprises:

generating a manipulated DCI message by setting a transmit power control (TPC) value in the DCI message transmitted from the base station;

inputting the manipulated DCI message at a signal timing suitable for a downlink channel transmitted from the base station; and changing uplink signal strength by decoding the manipulated DCI message at the target UE.

5. The method of claim 4, wherein the manipulated DCI message is to be received with stronger strength than a normal signal from perspective of the target UE.

6. The method of claim 4, wherein the changing of the uplink signal strength comprises overcoming a shadow area of the target UE by forcibly changing the uplink signal strength without the will of the base station or the target UE.

7. The method of claim 3, wherein the tracking of the physical location comprises distinguishing the target UE and a cellular repeater by monitoring a change width of uplink signal strength transmitted from the target UE.

8. The method of claim 7, wherein the tracking of the physical location comprises tracking a final physical location of the target UE with at least one location tracking method among Angle-of-Arrival (AoA), Time of Arrival (ToA), and Time Difference of Arrival (TDoA) through uplink/downlink monitoring in the mobile communication network.

9. A system for tracking a physical location of a user equipment (UE) in a mobile communication network, the system comprising:

a tracking unit configured to generate a specific traffic pattern by generating voice and short message service (SMS) traffic and to track a radio network traffic identifier (RNTI) of a target UE using fingerprinting based on the specific traffic pattern;

a signal receiver configured to fix the RNTI of the target UE and to continuously receive scheduling information on an uplink signal transmitted from the target UE by decoding a downlink control information (DCI) message transmitted from a base station; and a location tracking unit configured to track a physical location by monitoring the uplink signal of the target UE based on the scheduling information, and further comprising:

a signal controller configured to control the uplink signal transmitted from the target UE by manipulating the DCI message in a radio channel based on the RNTI of the target UE and a configuration of the base station.

* * * * *